United States Patent
Mao

(10) Patent No.: US 10,986,332 B2
(45) Date of Patent: Apr. 20, 2021

(54) PREDICTION MODE SELECTION METHOD, VIDEO ENCODING DEVICE, AND STORAGE MEDIUM

(71) Applicant: Tencent Technology (Shenzhen) Company Limited, Shenzhen (CN)

(72) Inventor: Xunan Mao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/373,313

(22) Filed: Apr. 2, 2019

(65) Prior Publication Data

US 2019/0230349 A1    Jul. 25, 2019

Related U.S. Application Data

(63) Continuation of application No. PCT/CN2018/086910, filed on May 15, 2018.

(30) Foreign Application Priority Data

Jun. 23, 2017    (CN) .......................... 201710486557.4

(51) Int. Cl.
     *H04B 1/66*      (2006.01)
     *H04N 7/12*      (2006.01)
     (Continued)

(52) U.S. Cl.
     CPC ........... *H04N 19/103* (2014.11); *H04N 19/11* (2014.11); *H04N 19/122* (2014.11);
     (Continued)

(58) Field of Classification Search
     CPC .................................................. H04N 19/103
     See application file for complete search history.

(56) References Cited

U.S. PATENT DOCUMENTS

| 2008/0304763 A1* | 12/2008 | Nagori | ................... | H04N 19/61 |
| | | | | 382/250 |
| 2014/0003509 A1* | 1/2014 | Hong | ..................... | H04N 19/11 |
| | | | | 375/240.12 |

(Continued)

FOREIGN PATENT DOCUMENTS

| CN | 103997645 A | 8/2014 |
| CN | 104333754 A | 2/2015 |

(Continued)

OTHER PUBLICATIONS

Shi W, Song T, Katayama T, Jiang X, Shimamoto T. Hardware implementation-oriented fast intra-coding based on downsampling information for HEVC. Journal of Real-Time Image Processing. Jun. 1, 2018;15(1):57-71. (Year: 2018).*

(Continued)

*Primary Examiner* — Fabio S Lima
(74) *Attorney, Agent, or Firm* — Morgan, Lewis & Bockius LLP

(57) ABSTRACT

Embodiments of the present application relate to a prediction mode selection method performed at a video encoding device, including: acquiring a first optimal intra-frame prediction mode of a downsampled unit obtained by downsampling an image frame to which a target prediction unit belongs and then dividing the downsampled image frame, and the first optimal intra-frame prediction mode obtained by performing precoding analysis on the downsampled unit; adding a candidate intra-frame prediction mode to a candidate mode set according to the first optimal intra-frame prediction mode; adding a candidate intra-frame prediction mode to the candidate mode set according to a second optimal intra-frame prediction mode of an adjacent PU corresponding to the target PU; and determining an optimal intra-frame prediction mode of a current PU according to (Continued)

prediction residuals and encoding cost values corresponding to the candidate intra-frame prediction modes in the candidate mode set.

20 Claims, 6 Drawing Sheets

(51) Int. Cl.
| | |
|---|---|
| H04N 11/02 | (2006.01) |
| H04N 11/04 | (2006.01) |
| H04N 19/103 | (2014.01) |
| H04N 19/122 | (2014.01) |
| H04N 19/159 | (2014.01) |
| H04N 19/176 | (2014.01) |
| H04N 19/11 | (2014.01) |
| H04N 19/147 | (2014.01) |
| H04N 19/59 | (2014.01) |
| H04N 19/593 | (2014.01) |
| H04N 19/61 | (2014.01) |

(52) U.S. Cl.
CPC ......... *H04N 19/147* (2014.11); *H04N 19/159* (2014.11); *H04N 19/176* (2014.11); *H04N 19/59* (2014.11); *H04N 19/593* (2014.11); *H04N 19/61* (2014.11)

(56) References Cited

U.S. PATENT DOCUMENTS

| | | | | |
|---|---|---|---|---|
| 2017/0155906 | A1* | 6/2017 | Puri | H04N 19/122 |
| 2017/0353720 | A1* | 12/2017 | Mao | H04N 19/159 |
| 2018/0205946 | A1* | 7/2018 | Zhang | H04N 19/136 |
| 2020/0195952 | A1* | 6/2020 | Choi | H04N 19/176 |

FOREIGN PATENT DOCUMENTS

| | | | |
|---|---|---|---|
| CN | 104601993 A | * | 5/2015 |
| CN | 104601993 A | | 5/2015 |
| CN | 104754338 A | * | 7/2015 |
| CN | 104754338 A | | 7/2015 |
| CN | 104883565 A | | 9/2015 |
| CN | 104954788 A | | 9/2015 |
| CN | 105208391 A | | 12/2015 |
| JP | 2007104117 A | | 4/2007 |
| JP | 2011205711 A | | 10/2011 |
| JP | 2015211386 A | | 11/2015 |
| JP | 2016506689 A | | 3/2016 |

OTHER PUBLICATIONS

Tencent Technology, WO, PCT/CN2018/086910, Aug. 1, 2018, 4 pgs.
Tencent Technology, IPRP, PCT/CN2018/086910, Dec. 24, 2019, 5 pgs.
Tencent Technology, ISR, PCTCN2018086910, Aug. 1, 2018, 2 pgs.

* cited by examiner

PREDICTION MODE SELECTION METHOD, VIDEO ENCODING DEVICE, AND STORAGE MEDIUM

CROSS-REFERENCE TO RELATED APPLICATIONS

This application is a continuation application of PCT/CN2018/086910, entitled "PREDICTION MODE SELECTION METHOD, VIDEO ENCODING DEVICE AND STORAGE MEDIUM" filed on May 15, 2018, which claims priority to Chinese Patent Application No. 201710486557.4, filed with the Chinese Patent Office on Jun. 23, 2017 and entitled "PREDICTION MODE SELECTION METHOD AND APPARATUS AND VIDEO ENCODING DEVICE", all of which are incorporated by reference in their entirety.

FIELD OF THE TECHNOLOGY

Embodiments of the present application relate to the field of video encoding technologies, and in particular, to a prediction mode selection method, a video encoding device, and a storage medium.

BACKGROUND OF THE DISCLOSURE

A High Efficiency Video Coding (HEVC) standard is a new-generation video encoding standard following H.264. 35 intra-frame prediction modes are defined in the HEVC standard. During encoding of an image frame, an optimal intra-frame prediction mode is selected from the 35 intra-frame prediction modes, and the optimal intra-frame prediction mode is used to perform encoding.

To select the optimal intra-frame prediction mode, for each prediction unit (PU) in an original image frame, prediction residuals of the PU in the 35 intra-frame prediction modes are calculated. Each prediction residual is used for indicating a difference between a predicted value predicted according to an intra-frame prediction mode and an original value. Candidate intra-frame prediction modes are further initially selected according to the prediction residuals. An encoding cost value of each selected candidate intra-frame prediction mode is calculated. A candidate intra-frame prediction mode corresponding to a minimum encoding cost value is determined as the optimal intra-frame prediction mode. The encoding cost value may be represented by using a bit rate after encoding and a distortion rate of a reconstructed image frame.

However, during the selection of an intra-frame prediction mode, a prediction residual needs to be calculated for all intra-frame prediction modes, and as a result, it takes a long time to select an intra-frame prediction mode, and a video encoding speed is reduced.

SUMMARY

Embodiments of the present application provide a prediction mode selection method, a video encoding device, and a storage medium, to resolve the problem that during the selection of an intra-frame prediction mode, a prediction residual needs to be calculated for all intra-frame prediction modes, and as a result, it takes a long time to select an intra-frame prediction mode, and a video encoding speed is reduced. The technical solution is as follows:

According to a first aspect of the embodiments of the present application, a prediction mode selection method is performed by a video encoding device having one or more processors and memory storing instructions to be executed by the one or more processors, the method including:

acquiring a first optimal intra-frame prediction mode of a downsampled unit corresponding to a target PU, the downsampled unit being obtained by downsampling an image frame to which the target PU belongs and then dividing the downsampled image frame, and the first optimal intra-frame prediction mode being obtained by performing precoding analysis on the downsampled unit;

adding a candidate intra-frame prediction mode to a candidate mode set according to the first optimal intra-frame prediction mode;

adding a candidate intra-frame prediction mode to the candidate mode set according to a second optimal intra-frame prediction mode of an adjacent PU corresponding to the target PU; and determining an optimal intra-frame prediction mode of a current PU according to prediction residuals and encoding cost values corresponding to the candidate intra-frame prediction modes in the candidate mode set.

According to a second aspect of the embodiments of the present application, a video encoding device is provided with one or more processors, memory coupled to the one or more processors, and instructions stored in the memory that, when executed by the one or more processors, cause the video encoding device to perform the aforementioned prediction mode selection method.

According to a third aspect of the embodiments of the present application, a non-transitory computer readable storage medium is provided with a plurality of instructions in connection with a video encoding device having one or more processors. The plurality of instructions, when executed by the one or more processors, cause the video encoding device to perform the aforementioned prediction mode selection method.

In the embodiments of the present application, during the selection of an optimal intra-frame prediction mode of a target PU, first, based on a characteristic that a downsampled unit keeps a feature of an original PU, a first optimal intra-frame prediction mode of a downsampled unit obtained during precoding is acquired, and some candidate intra-frame prediction modes are determined based on the first optimal intra-frame prediction mode of the downsampled unit; and then, based on a characteristic that adjacent PUs have similar features, some more candidate intra-frame prediction modes are determined according to second optimal intra-frame prediction modes of adjacent PUs of a current PU, so that an optimal intra-frame prediction mode of the current PU is selected from the determined candidate intra-frame prediction modes. Prediction residuals corresponding to only some candidate intra-frame prediction modes need to be calculated, and therefore, it takes a shortened time to select an intra-frame prediction mode, so that a video encoding speed is increased.

BRIEF DESCRIPTION OF THE DRAWINGS

To illustrate the technical solutions in the embodiments of the present invention more clearly, drawings required in description of the embodiments will be introduced simply in the following. It is obvious that the drawings in the following description are only some of the embodiments of the present invention, and a person of ordinary skill in the art may obtain other drawings based on the drawings without creative efforts.

DESCRIPTION OF EMBODIMENTS

To make the objectives, technical solutions, and advantages in the present disclosure clearer, the following further describes the implementations of the present disclosure in detail with reference to the accompanying drawings.

The "plurality" in this specification means two or more. "and/or" in this specification merely describes an association between associated objects, indicating that three relationships may exist, for example, A and/or B may indicate three situations: only A exists, A and B exist at the same time, and only B exists. In addition, the character "/" in this specification usually represents that the former and latter associated objects are in an "or" relationship.

For convenient understanding, the nouns used in the embodiments of the present application are explained below.

Image frame: An image frame is a basic unit of a video. To be specific, a video consists of several image frames. A block-based encoding scheme is generally used for video compression encoding. To be specific, one image frame in the video is divided into a plurality of non-overlapping blocks, and these blocks are then encoded. An inter-frame encoding scheme or an intra-frame encoding scheme may be used during video encoding of each image frame. The embodiments of the present application mainly involve an intra-frame encoding scheme.

Intra-frame prediction encoding: A video has a sequence of images with very high spatial correlation. For example, the background of an image frame is a wall with the same pattern and texture. Therefore, among several blocks of the image frame, wall-related blocks may display the same or similar information. These blocks with high spatial correlation may be encoded by using an intra-frame prediction technology.

PU: A PU is a basic unit in prediction encoding of an image frame. In a HEVC standard, a PU may be a block with a size of 64×64 pixels, 32×32 pixels, 16×16 pixels or 8×8 pixels.

Figure 1:
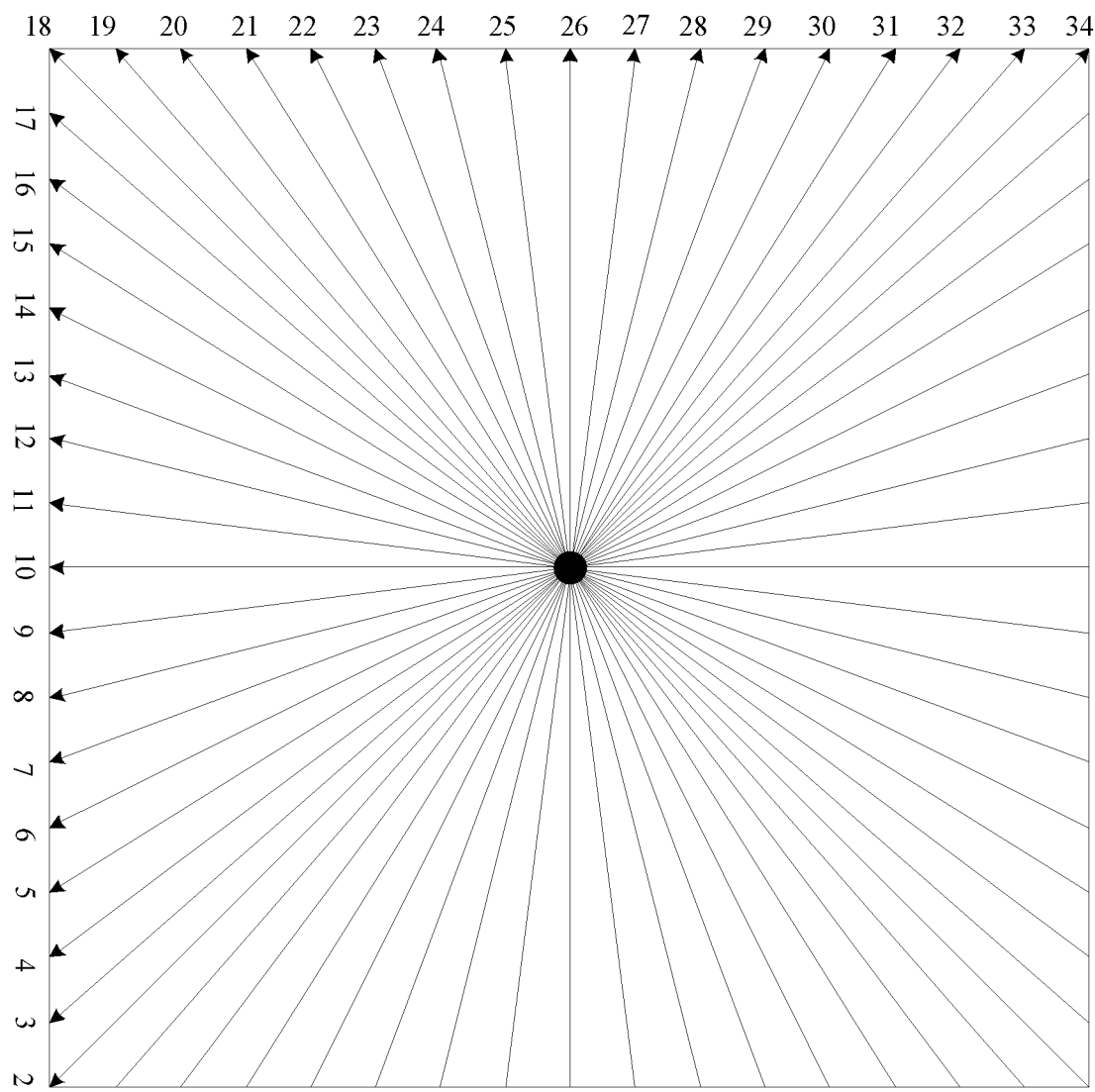
FIG. 1 is a schematic diagram of 33 directions related to intra-frame prediction modes according to an embodiment of the present invention.

Intra-frame prediction mode: In this prediction mode, an adjacent row of pixels above a current PU and an adjacent row of pixels on the left of the current PU are used for prediction during intra-frame prediction encoding. The HEVC standard provides 35 intra-frame prediction modes: a planar prediction mode, a direct current (DC) prediction mode, and 33 directional prediction modes. The 33 directional prediction modes include a prediction mode in a direction ang_2 to a prediction mode in a direction ang_34. The direction ang_10 corresponds to a horizontal prediction mode, and the direction ang_26 corresponds to a vertical prediction mode. As shown in FIG. 1, the directions are arranged clockwise from the lower left corner (45°) to the upper right corner (45°) in ascending order of sequence numbers.

Adjacent intra-frame prediction mode: If a current intra-frame prediction mode is a directional prediction mode, a +i mode and an −i mode of the current intra-frame prediction mode are adjacent intra-frame prediction modes of the current intra-frame prediction mode, where i=1 or 2. For example, as shown in FIG. 1, adjacent intra-frame prediction modes are a +2 mode and a −2 mode. Adjacent intra-frame prediction modes of an ang_10 intra-frame prediction mode are an ang_8 intra-frame prediction mode and an ang_12 intra-frame prediction mode.

Adjacent PU: In the embodiments of the present application, adjacent PUs of a current PU includes an upper PU located above the current PU, and/or, a left PU located on the left of the current PU. It should be noted that if the current PU is located at the left edge of an image frame, the current PU does not have a corresponding left PU. If the current PU is located at the upper edge of an image frame, the current PU does not have a corresponding upper PU.

Before the selection of an optimal intra-frame prediction mode of a target PU, first, a prediction residual needs to be calculated for all intra-frame prediction modes, so that some intra-frame prediction modes are selected according to prediction residuals. Obviously, a PU with a relatively large size, for example, a PU having 16×16 pixels, 32×32 pixels or 64×64 pixels, includes a large quantity of pixels. Therefore, a large amount of processing resources and a long time are needed to calculate prediction residuals for a large size PU. However, it is found during actual application that it is less probable to eventually choose a large size PU to use an intra-frame prediction mode. As a result, processing resources are wasted to calculate prediction residuals for all intra-frame prediction modes of a large size PU.

In the embodiments of the present application, when a video encoding device selects an optimal intra-frame prediction mode of a large size PU, an optimal intra-frame prediction mode of a downsampled unit obtained during precoding analysis of a video and optimal intra-frame prediction modes of adjacent PUs are used to initially select some intra-frame prediction modes. In this way, prediction residuals of only some intra-frame prediction modes need to be calculated, and a calculation amount for calculating prediction residuals is reduced, so that a video encoding speed is increased.

A prediction mode selection method provided in the embodiments of the present application may be applied to a scenario in which a video needs to be encoded. The method is applied to the video encoding device. The video encoding device may be a mobile terminal installed with video codec software or may be a server having video codec functions. After the foregoing method is used, the video encoding device has an increased encoding rate, and a calculation amount is reduced during encoding. For convenient description, the following embodiments are described by using an example in with the prediction mode selection method is applied to the video encoding device.

In some embodiments, the prediction mode selection method can be applied to the following product scenarios:

Scenario of a Video Call in an Instant Messaging Application

An instant messaging application usually provides a video call function. When the video call function is used, a mobile terminal encodes captured image frames and transmits encoded image frame data to a server, and the server sends the image frame data to a peer mobile terminal, so that the peer mobile terminal decodes the image frame data and displays the image frames. The speed at which the mobile terminal encodes the image frames directly affects the quality of a video call. If the mobile terminal uses the prediction mode selection method provided in the embodiments of the present application, an optimal intra-frame prediction mode of a current PU can be determined according to optimal intra-frame prediction modes of a downsampled unit and adjacent PUs. In this way, PUs are encoded according to the determined optimal intra-frame prediction mode, so that the encoding speed of the mobile terminal is increased, and the quality of a video call is eventually improved.

Scenario of Video Encoding in a Video Recording Application

During the use of a video recording application, a terminal encodes captured image frames and generates a corresponding video file eventually. When intra-frame prediction modes in related technologies are used to perform intra-frame encoding on the image frames, prediction residuals need to be calculated 35 times for each PU in an image frame to determine an optimal intra-frame prediction mode, causing relatively low encoding efficiency and a large calculation amount during encoding. As a result, after a video is recorded, there will be a relatively long wait before a video file can be obtained. When the prediction mode selection method provided in the embodiments of the present application is used to select an optimal intra-frame prediction mode, a calculation amount is reduced during encoding, and therefore, the encoding speed is increased, so that a corresponding video file can be obtained as soon as a video is recorded.

It should be noted that the foregoing product scenarios are only used for exemplary description. In other possible implementations, the prediction mode selection method provided in the embodiments of the present application can be used in all scenarios in which intra-frame encoding is involved. This is not limited in the embodiments of the present application.

Figure 2:
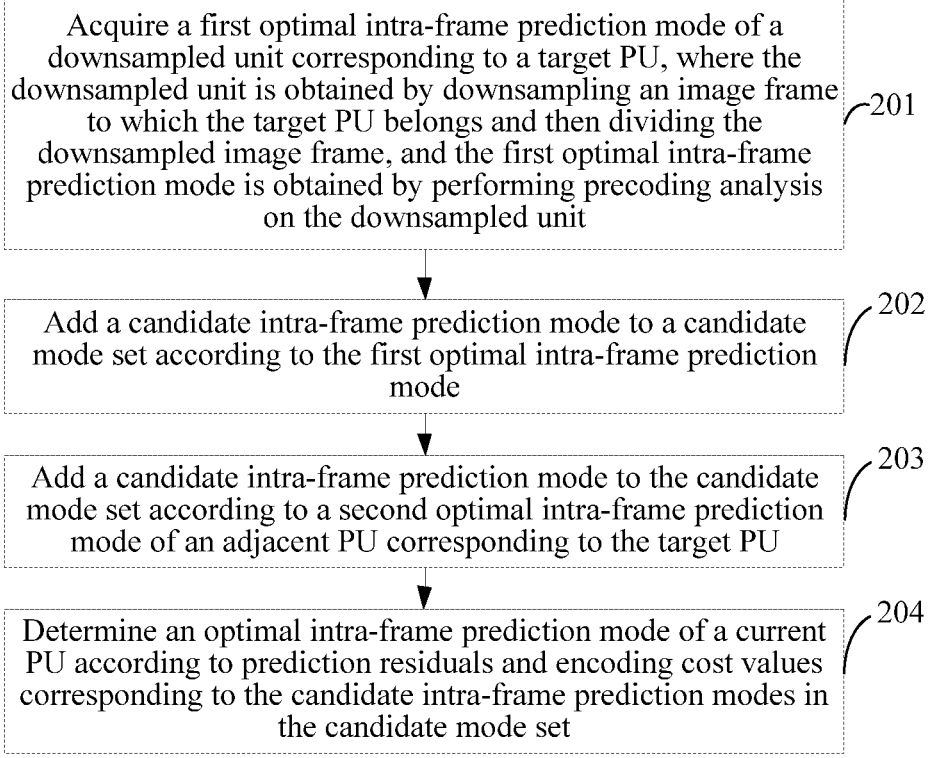
FIG. 2 is a flowchart of a prediction mode selection method according to an embodiment of the present application.

FIG. 2 is a flowchart of a prediction mode selection method according to an embodiment of the present application. In this embodiment, the application of the prediction mode selection method to a video encoding device is described for exemplary purposes. The method includes the following steps:

Step 201: The video encoding device acquires a first optimal intra-frame prediction mode of a downsampled unit corresponding to a target PU, where the downsampled unit is obtained by downsampling an image frame to which the target PU belongs and then dividing the downsampled image frame, and the first optimal intra-frame prediction mode is obtained by performing precoding analysis on the downsampled unit.

The target PU is a pixel block obtained by dividing the image frame according to a preset pixel size. The target PU may be a pixel block with 16×16 pixels, 32×32 pixels or 64×64 pixels. Target PUs in this embodiment of the present application are pixel blocks sequentially acquired from top to bottom and from left to right. In other possible manners of description, the target PU may also be referred to as a current PU. A specific name of the target PU is not limited in this embodiment of the present application.

An existing algorithm in the field of video encoding is performing precoding analysis on a downsampled image frame and is widely applied to algorithms such as adaptive I frame (intra-frame coded frame) interval selection, an adaptive B frame (bidirectionally predicted, interpolative coded frame) quantization, bit rate control, and the like. A procedure of precoding analysis is as follows:

1. Perform 2:1 downsampling on the image frame to obtain the downsampled image frame.

For example, if the image frame has an original length of a and an original width of b, the obtained downsampled image frame has a length of 0.5a and a width of 0.5b.

2. Divide the downsampled image frame into downsampled units with 8×8 pixels.

When the length or width of the downsampled image frame is not an integer multiple of 8, the downsampled image frame needs to be padded in advance. The length and width of the padded downsampled image frame are both integer multiples of 8.

3. Perform intra-frame precoding on the downsampled units, and select an optimal intra-frame prediction mode.

When intra-frame prediction is used for a downsampled unit, the video encoding device performs intra-frame precoding on the downsampled unit, selects an optimal intra-frame prediction mode, and calculates an encoding cost value corresponding to the optimal intra-frame prediction mode.

It should be noted that during the intra-frame precoding of the downsampled unit, the video encoding device further performs inter-frame precoding on the downsampled unit, selects an optimal inter-frame prediction mode, and calculates an encoding cost value corresponding to the optimal inter-frame prediction mode.

Because the downsampled unit is a thumbnail of a corresponding PU in an original image frame, the optimal intra-frame prediction mode of the downsampled unit can represent an optimal intra-frame prediction mode of the target PU to a certain degree. Therefore, the video encoding device first acquires the first optimal intra-frame prediction mode of the downsampled unit corresponding to the target PU.

Figure 3:
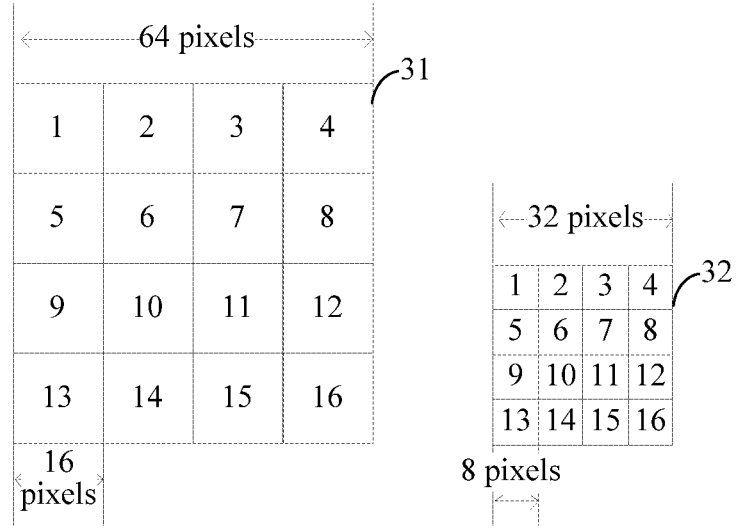
FIG. 3 is a schematic diagram of a correspondence between a current PU and a downsampled unit.

Schematically, as shown in FIG. 3, a current image frame 31 has 64×64 pixels, and a corresponding downsampled image frame 32 has 32×32 pixels. The current image frame 31 includes 16 PUs (sequence numbers are 1 to 16) with 16×16 pixels. The downsampled image frame 32 includes 16 downsampled units (sequence numbers are 1 to 16) with 16×16 pixels. A PU and a downsampled unit that have the same sequence number correspond to each other.

Step 202: The video encoding device adds a candidate intra-frame prediction mode to a candidate mode set according to the first optimal intra-frame prediction mode.

Because the downsampled image frame loses some details as compared with the original image frame, the optimal intra-frame prediction mode of the target PU may be different from the first optimal intra-frame prediction mode of the corresponding downsampled unit. To improve the accuracy and comprehensiveness of selected candidate intra-frame prediction modes, the video encoding device obtains several extended candidate intra-frame prediction modes based on the first optimal intra-frame prediction mode of the downsampled unit, and adds the candidate intra-frame prediction modes to the candidate mode set.

Step 203: The video encoding device adds a candidate intra-frame prediction mode to the candidate mode set according to a second optimal intra-frame prediction mode of an adjacent PU corresponding to the target PU.

Because adjacent PUs in the same image frame have relatively high correlation, the optimal intra-frame prediction mode of the target PU and an optimal intra-frame prediction mode of an adjacent PU of the target PU also have relatively high correlation. In a possible implementation, the video encoding device acquires the second optimal intra-frame prediction mode of the adjacent PU corresponding to the target PU, and obtains several extended candidate intra-frame prediction modes according to the second optimal intra-frame prediction mode, and adds the extended candidate intra-frame prediction modes to the candidate mode set.

In some embodiments, because intra-frame encoding is row-by-row encoding from left to right and from top to bottom, the adjacent PU corresponding to the target PU is an upper PU (the lower edge of the upper PU is adjacent to the upper edge of the current PU) located above the target PU, and/or, a left PU (the right edge of the left PU is adjacent to the left edge of the current PU) located on the left of the target PU. An intra-frame prediction mode has been selected for the adjacent PU of the target PU. During acquisition of the second optimal intra-frame prediction mode, it is first detected whether the target PU has a corresponding upper PU and/or left PU (a PU located at the upper edge of an image frame does not have an upper PU, and a PU located at the left edge of an image frame does not have a left PU). If it is detected that the current PU has a corresponding upper PU and/or left PU, the second optimal intra-frame prediction mode of the upper PU and/or the left PU is further acquired.

It should be noted that there is no strict precedence relationship between the foregoing steps 201 and 202 and step 203. To be specific, step 203 may be performed before steps 201 and 202, or may be performed at the same time as steps 201 and 202. This is not limited in this embodiment of the present application.

To enable the candidate mode set to include directional prediction modes and non-directional prediction modes, the video encoding device adds a planar mode and a DC mode to the candidate mode set.

Step 204: The video encoding device determines an optimal intra-frame prediction mode of a current PU according to prediction residuals and encoding cost values corresponding to the candidate intra-frame prediction modes in the candidate mode set.

Compared with an intra-frame prediction mode outside the candidate mode set, a candidate intra-frame prediction mode in the candidate mode set is more probably used as the optimal intra-frame prediction mode. Therefore, after the candidate mode set is generated, the video encoding device calculates prediction residuals and the encoding cost values corresponding to the candidate intra-frame prediction modes in the candidate mode set, and eventually determines the optimal intra-frame prediction mode of the current PU according to prediction residuals and the encoding cost values.

In a possible implementation, this step include is the following steps:

1. Calculate prediction residuals corresponding to the candidate intra-frame prediction modes in the candidate mode set. Each prediction residual is used for indicating a difference between a predicted value predicted according to a candidate intra-frame prediction mode and an original value.

When a prediction residual corresponding to a candidate intra-frame prediction mode is smaller, it indicates that a PU generated by using the candidate intra-frame prediction mode is closer to an original image unit.

In some embodiments, the video encoding device calculates a prediction residual in any manner of a sum of absolute Hadamard transformed differences (SATD), a sum of absolute differences (SAD) or a sum of absolute transformed differences (SATD). This is not limited in this embodiment of the present application.

2. Sort the candidate intra-frame prediction modes in ascending order of prediction residuals.

3. If the first candidate intra-frame prediction mode is a directional prediction mode, and the adjacent intra-frame prediction mode of the first candidate intra-frame prediction mode does not belong to the candidate mode set, add the adjacent intra-frame prediction mode of the first candidate intra-frame prediction mode to the candidate mode set.

In some embodiments, after the candidate intra-frame prediction modes are sorted according to the prediction residuals, the video encoding device further detects whether the first candidate intra-frame prediction mode is a directional prediction mode. If the first candidate intra-frame prediction mode is a directional prediction mode, the video encoding device further detects whether an adjacent intra-frame prediction mode of the directional prediction mode belongs to the candidate mode set. When the adjacent intra-frame prediction mode of the directional prediction mode does not belong to the candidate mode set, the video encoding device adds the adjacent intra-frame prediction mode to the candidate mode set, returns to perform steps 1 and 2, and initially selects the candidate mode set again, thereby further improving the quality of the candidate intra-frame prediction modes in the candidate mode set.

It should be noted that the video encoding device may skip step 3 and directly perform step 4 instead. This is not limited in this embodiment.

4. Determine first k candidate intra-frame prediction modes as target candidate intra-frame prediction modes, where k≥2.

In some embodiments, the video encoding device deletes a candidate intra-frame prediction mode other than the first k candidate intra-frame prediction modes (because there is a relatively large difference between the predicted value and the original value, to be specific, distortion is severe), so that subsequently encoding cost values of only the first k candidate intra-frame prediction modes need to be calculated, thereby reducing a calculation amount.

5. Calculate encoding cost values corresponding to the target candidate intra-frame prediction modes.

In a possible implementation, for each target candidate intra-frame prediction mode, the video encoding device performs actual encoding according to the target candidate intra-frame prediction mode, calculates a distortion rate of a reconstructed image frame and a bit rate after encoding, and further calculates an encoding cost value according to the distortion rate and the bit rate after encoding. The encoding cost value cost=D+λR, where D is a distortion rate (a SATD of pixel differences between the reconstructed image frame and the original image frame may be used), R is the bit rate after encoding, and λ is a Lagrangian constant.

A process of calculating the distortion rate of the reconstructed image frame includes: performing dequantization and inverse transformation on the target PU according to a target candidate intra-frame prediction mode to obtain the reconstructed image frame; and calculating a distortion rate according to the reconstructed image frame and the original image frame to which the target PU belongs.

A process of calculating the bit rate after encoding includes: performing transformation, quantization, and entropy encoding on the prediction residual calculated in the first step to obtain an encoded code stream; and calculating the bit rate after encoding according to the code stream.

6. Determine a target candidate intra-frame prediction mode corresponding to a minimum encoding cost value as an optimal intra-frame prediction mode of the target PU.

Eventually, the video encoding device determines the target candidate intra-frame prediction mode corresponding to the minimum encoding cost value as the optimal intra-frame prediction mode of the current PU. When the optimal intra-frame prediction mode is used to encode the current PU, the distortion rate is relatively low, and the bit rate is relatively low.

In conclusion, in this embodiment of the present application, during the selection of an optimal intra-frame prediction mode of a target PU, first, based on a characteristic that a downsampled unit keeps a feature of an original PU, a first optimal intra-frame prediction mode of a downsampled unit obtained during precoding is acquired, and some candidate intra-frame prediction modes are determined based on the first optimal intra-frame prediction mode of the downsampled unit; and then, based on a characteristic that adjacent PUs have similar features, some more candidate intra-frame prediction modes are determined according to second optimal intra-frame prediction modes of adjacent PUs of a current PU, so that an optimal intra-frame prediction mode of the current PU is selected from the determined candidate intra-frame prediction modes. Prediction residuals corresponding to only some candidate intra-frame prediction modes need to be calculated, and therefore, it takes a shortened time to select an intra-frame prediction mode, so that a video encoding speed is increased.

Figure 4:
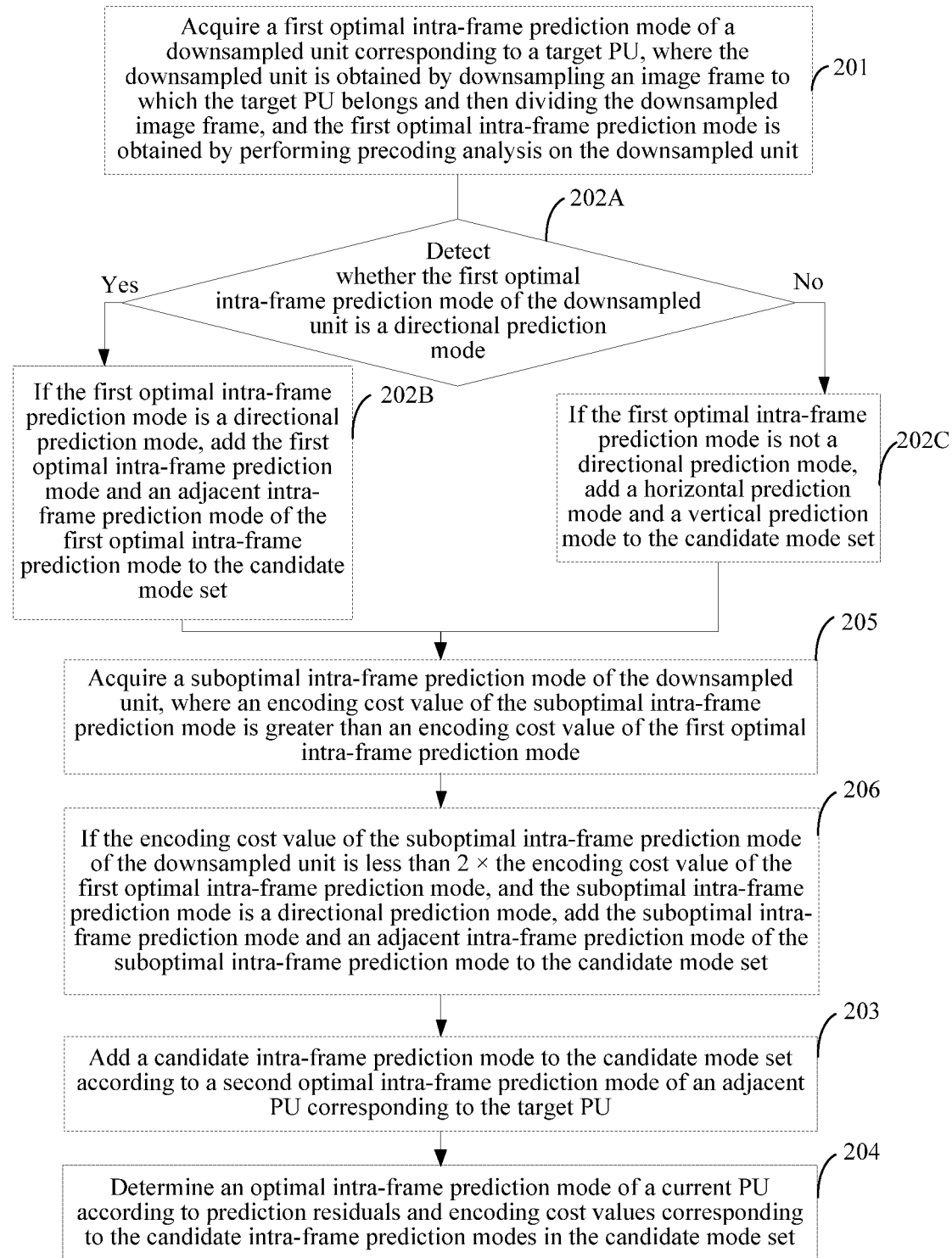
FIG. 4 is a flowchart of a prediction mode selection method according to another embodiment of the present application.

In some embodiments, for PUs with different sizes, the video encoding device uses different manners to add a candidate intra-frame prediction mode to the candidate mode set according to the first optimal intra-frame prediction mode of the downsampled unit. In a possible implementation, when the target PU has 16×16 pixels, and the downsampled unit has 8×8 pixels, based on FIG. 2, as shown in FIG. 4, the foregoing step 202 includes the following steps:

Step 202A: The video encoding device detects whether the first optimal intra-frame prediction mode of the downsampled unit is a directional prediction mode.

When the target PU has 16×16 pixels, and the downsampled unit obtained through downsampling has 8×8 pixels, in this case, the target PUs correspond to the downsampled units one by one. Therefore, the video encoding device obtains several extended candidate intra-frame prediction modes based on one optimal intra-frame prediction mode.

After acquiring the first optimal intra-frame prediction mode of the downsampled unit, the video encoding device detects whether the first optimal intra-frame prediction mode is a directional prediction mode. If the first optimal intra-frame prediction mode is a directional prediction mode (that is, corresponding to a direction ang_2 to a direction ang_34), the video encoding device performs the following step 202B. If the first optimal intra-frame prediction mode is not a directional prediction mode (that is, the planar mode or the DC mode), the video encoding device performs the following step 202C.

Step 202B: If the first optimal intra-frame prediction mode is a directional prediction mode, the video encoding device adds the first optimal intra-frame prediction mode and an adjacent intra-frame prediction mode of the first optimal intra-frame prediction mode to the candidate mode set.

Because a downsampled unit loses some picture details as compared with a target PU, when detecting that the first optimal intra-frame prediction mode of the downsampled unit is a directional prediction mode, after adding the first optimal intra-frame prediction mode to the candidate mode set, the video encoding device further needs to add a similar adjacent intra-frame prediction mode in a direction corresponding to the first optimal intra-frame prediction mode to the candidate mode set.

In a possible implementation, adjacent intra-frame prediction modes of the first optimal intra-frame prediction mode are a +i mode and a −i mode of the first optimal intra-frame prediction mode, where i=1 or 2. To be specific, when a direction corresponding to the first optimal intra-frame prediction mode of the downsampled unit is ang_N, directions corresponding to the adjacent intra-frame prediction mode are ang_(N−i) and ang_(N+i). It should be noted that when N−i<2, ang_(N−i) is ang_(N−i+33). When N+i>34, ang_(N+i) is ang_(N+i−33).

Schematically, as shown in FIG. 1, when the direction corresponding to the first optimal intra-frame prediction mode of the downsampled unit is ang_2, directions corresponding to adjacent intra-frame prediction modes of the first optimal intra-frame prediction mode are ang_4 and ang_33. When the direction corresponding to the first optimal intra-frame prediction mode of the downsampled unit is ang_33, the directions corresponding to the adjacent intra-frame prediction modes of the first optimal intra-frame prediction mode are ang_31 and ang_2.

Step 202C: If the first optimal intra-frame prediction mode is not a directional prediction mode, the video encoding device adds a horizontal prediction mode and a vertical prediction mode to the candidate mode set.

The horizontal prediction mode is an intra-frame prediction mode corresponding to the direction ang_10, and the vertical prediction mode is an intra-frame prediction mode corresponding to the direction ang_26.

The horizontal prediction mode and the vertical prediction mode are more probably optimal intra-frame prediction modes. Therefore, when detecting that the first optimal intra-frame prediction mode of the downsampled unit is not a directional prediction mode (that is, the planar mode or the DC mode), the video encoding device adds the horizontal prediction mode and the vertical prediction mode to the candidate mode set.

After the foregoing steps 202A to 202C, the candidate mode set includes 4 to 5 candidate intra-frame prediction modes (including the planar mode and the DC mode added in advance).

To prevent an actual optimal intra-frame prediction mode from missing in the candidate mode set, in a possible implementation, the video encoding device further obtains an extended candidate intra-frame prediction mode again based on a suboptimal intra-frame prediction mode of the downlink sampled unit.

In some embodiments, as shown in FIG. 4, after the foregoing steps 202A to 202C, the following steps are further included.

Step 205: The video encoding device acquires a suboptimal intra-frame prediction mode of the downsampled unit, where an encoding cost value of the suboptimal intra-frame prediction mode is greater than an encoding cost value of the first optimal intra-frame prediction mode.

In some embodiments, the suboptimal intra-frame prediction mode and the first optimal intra-frame prediction mode are output together in a video precoding analysis stage. The encoding cost value of the suboptimal intra-frame prediction mode is greater than the encoding cost value of the first optimal intra-frame prediction mode, and is less than encoding cost values of the other 33 intra-frame prediction modes.

Step 206: If the encoding cost value of the suboptimal intra-frame prediction mode of the downsampled unit is less than 2×the encoding cost value of the first optimal intra-frame prediction mode, and the suboptimal intra-frame prediction mode is a directional prediction mode, the video encoding device adds the suboptimal intra-frame prediction mode and an adjacent intra-frame prediction mode of the suboptimal intra-frame prediction mode to the candidate mode set.

Further, the video encoding device detects whether the encoding cost values of the first optimal intra-frame prediction mode and the suboptimal intra-frame prediction mode of the downsampled unit are close, and when the encoding cost values of the two modes are close, the extended candidate intra-frame prediction mode is obtained based on the suboptimal intra-frame prediction mode of a downlink sampled unit.

In a possible implementation, the encoding cost value of the first optimal intra-frame prediction mode of the downsampled unit is m, and the encoding cost value of the suboptimal intra-frame prediction mode is n. If n<2m, the video encoding device further detects whether the suboptimal intra-frame prediction mode is a directional prediction mode. If the suboptimal intra-frame prediction mode is a directional prediction mode, the video encoding device adds the suboptimal intra-frame prediction mode and the adjacent intra-frame prediction mode of the suboptimal intra-frame prediction mode to the candidate mode set. If the suboptimal intra-frame prediction mode is not a directional prediction mode, the video encoding device no longer adds a candidate intra-frame prediction mode to the candidate mode set based on the suboptimal intra-frame prediction mode.

After the foregoing steps 205 and 206, the candidate mode set includes 4 to 8 candidate intra-frame prediction modes.

In this embodiment, a video encoding device extends a candidate mode set based on the first optimal intra-frame prediction mode and/or the suboptimal intra-frame prediction mode of the downsampled unit, so that while the quality of candidate intra-frame prediction modes is ensured, a quantity of candidate intra-frame prediction modes is reduced, thereby further reducing a subsequent calculation amount.

Figure 5:
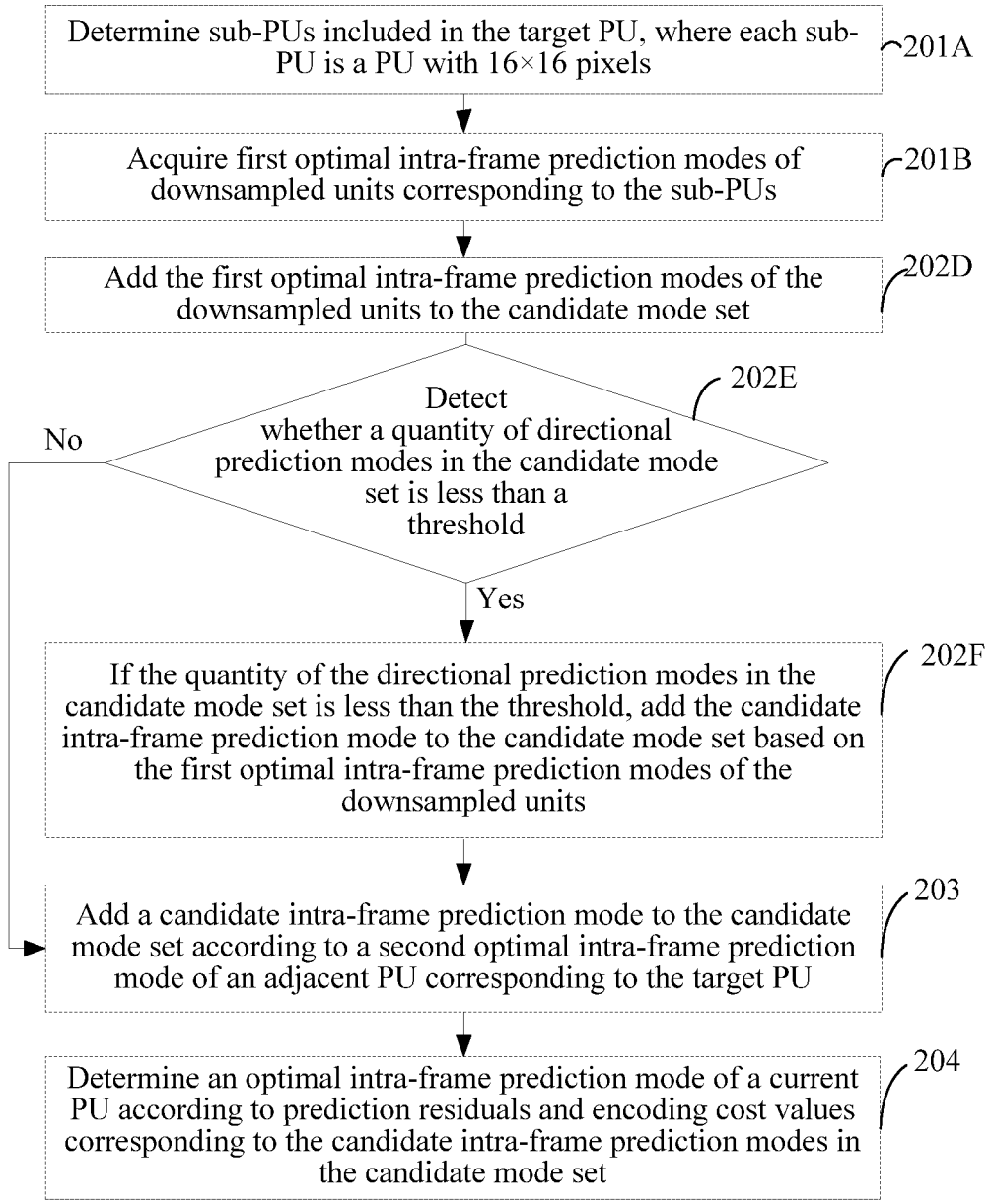
FIG. 5 is a flowchart of a prediction mode selection method according to another embodiment of the present application.

In another possible implementation, when the target PU has 32×32 pixels or 64×64 pixels, and the downsampled unit has 8×8 pixels, based on FIG. 2, as shown in FIG. 5, the foregoing step 201 includes step 201A and 201B, and the foregoing step 202 includes step 202D to 202F.

Step 201A: The video encoding device determines sub-PUs included in the target PU, where each sub-PU is a PU with 16×16 pixels.

When the size of the target PU is 32×32 pixels or 64×64 pixels, the target PU includes a plurality of sub-PUs with 16×16 pixels. When the size of the target PU is 32×32 pixels, the target PU corresponds to 4 sub-PUs. When the size of the target PU is 64×64 pixels, the target PU corresponds to 16 sub-PUs.

Schematically, as shown in FIG. 3, one PU with 32×32 pixels includes sub-PUs with sequence numbers 1, 2, 5, and 6.

Step 201B: The video encoding device acquires first optimal intra-frame prediction modes of downsampled units corresponding to the sub-PUs.

Each sub-PU corresponds to a respective downsampled unit. Therefore, after the sub-PUs are determined, the video encoding device further acquires the first optimal intra-frame prediction modes of the downsampled units corresponding to the sub-PUs.

When the size of the current PU is 32×32 pixels, the video encoding device acquires optimal intra-frame prediction modes of 4 downsampled units. When the size of the current PU is 64×64 pixels, the video encoding device acquires optimal intra-frame prediction modes of 16 downsampled units.

Step 202D: The video encoding device adds the first optimal intra-frame prediction modes of the downsampled units to the candidate mode set.

Further, the video encoding device adds the acquired first optimal intra-frame prediction modes of the downsampled units to the candidate mode set.

Optimal intra-frame prediction modes of different downsampled units may be the same. Therefore, when an optimal intra-frame prediction mode is added to the candidate mode set, same optimal intra-frame prediction modes need to be deduplicated.

Schematically, when the size of the target PU is 32×32 pixels, the optimal intra-frame prediction modes of 4 downsampled units acquired by the video encoding device are: ang_5, ang_8, ang_5, and ang_5. The video encoding device adds ang_5 and ang_8 to the candidate mode set.

Step 202E: The video encoding device detects whether a quantity of directional prediction modes in the candidate mode set is less than a threshold.

After the candidate intra-frame prediction modes (including the first optimal intra-frame prediction modes of the downsampled units) are added to the candidate mode set, the video encoding device detects whether the quantity of the directional prediction modes in the candidate mode set is less than the threshold. If the quantity of the directional prediction modes is less than the threshold, to prevent an actual optimal intra-frame prediction mode from missing in the candidate mode set, the video encoding device further extends the candidate mode set according to the optimal intra-frame prediction modes of the downsampled units and performs the following step 202F. If the quantity of the directional prediction modes is greater than the threshold, the video encoding device performs step 203. In some embodiments, the threshold is 7 or 8.

Step 202F: If the quantity of the directional prediction modes in the candidate mode set is less than the threshold, the video encoding device adds the candidate intra-frame prediction mode to the candidate mode set based on the first optimal intra-frame prediction modes of the downsampled units.

In a possible implementation, this step includes the following steps:

1. If the first optimal intra-frame prediction modes of the downsampled units include the same directional prediction mode, an adjacent intra-frame prediction mode of the same directional prediction mode is added to the candidate mode set.

When the optimal intra-frame prediction modes of the downsampled units include the same directional prediction mode, the optimal intra-frame prediction modes of the sub-PUs are more probably the same, and the current PU presents a relatively distinctive texture characteristic (that is, prediction may be made in a texture direction). Correspondingly, the same directional prediction mode and the adjacent intra-frame prediction mode of the same directional prediction mode more probably have optimal intra-frame prediction modes. Therefore, the video encoding device adds the adjacent intra-frame prediction mode of the same directional prediction mode to the candidate mode set.

Schematically, when it is acquired that optimal intra-frame prediction modes of 4 downsampled units are ang_5, ang_8, ang_5, and ang_5, the video encoding device adds the adjacent intra-frame prediction modes ang_3 and ang_7 of ang_5 to the candidate mode set.

2. If the candidate mode set includes a directional prediction mode, an adjacent intra-frame prediction mode of the directional prediction mode, a horizontal prediction mode, and a vertical prediction mode are added to the candidate mode set.

If the candidate mode set includes only one directional prediction mode, the video encoding device adds the horizontal prediction mode and the vertical prediction mode that are more probably optimal intra-frame prediction modes to the candidate mode set and adds the adjacent intra-frame prediction mode of the directional prediction mode to the candidate mode set.

3. If the candidate mode set includes n directional prediction modes, adjacent intra-frame prediction modes corresponding to the n directional prediction modes are added to the candidate mode set, where 1<n≤3.

When the candidate mode set includes a few directional prediction modes, the video encoding device adds adjacent intra-frame prediction modes of the existing directional prediction modes in the candidate mode set to the candidate mode set.

When the candidate mode set only includes 2 directional prediction modes, the video encoding device adds 4 candidate intra-frame prediction modes to the candidate mode set. When the candidate mode set includes only 3 directional prediction modes, the video encoding device adds 6 candidate intra-frame prediction modes to the candidate mode set.

In this embodiment, when a large size PU includes a plurality of small size sub-PUs, the video encoding device extends the candidate mode set according to the downsampled units corresponding to the sub-PUs, thereby ensuring the quality of the candidate intra-frame prediction modes in the candidate mode set. In addition, the quantity of candidate intra-frame prediction modes is reduced, thereby further reducing a subsequent calculation amount.

Figure 6:
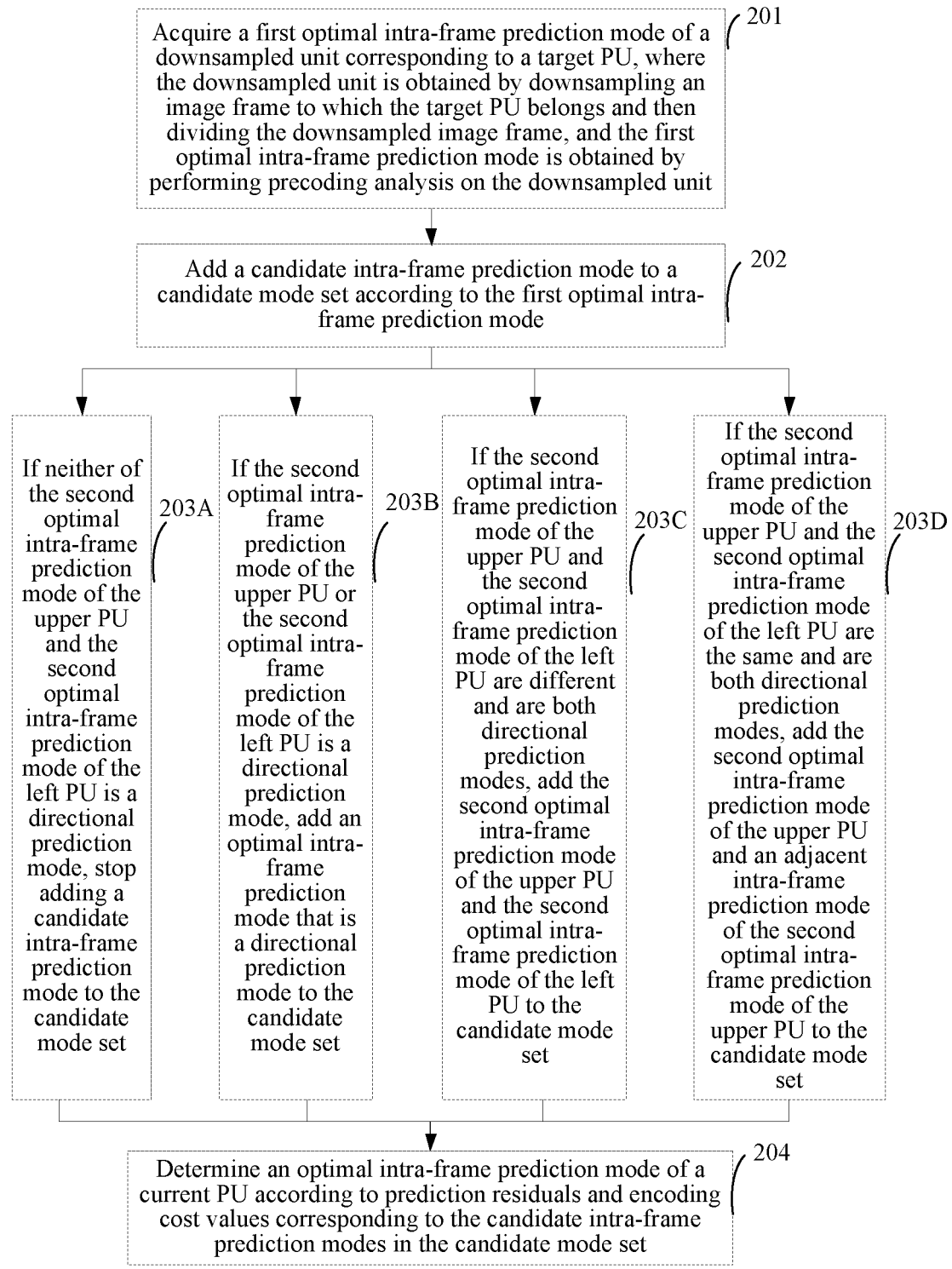
FIG. 6 is a flowchart of a prediction mode selection method according to another embodiment of the present application.

For a process of adding a candidate intra-frame prediction mode to the candidate mode set according to an adjacent PU, in a possible implementation, the adjacent PU includes an upper PU located above the current PU, and/or, a left PU located on the left of the current PU, based on FIG. 2, as shown in FIG. 6, the foregoing step 203 includes the following steps:

Step 203A: If neither of the second optimal intra-frame prediction mode of the upper PU and the second optimal intra-frame prediction mode of the left PU is a directional prediction mode, the video encoding device stops adding a candidate intra-frame prediction mode to the candidate mode set.

When an extended candidate intra-frame prediction mode is obtained according to an adjacent PU of a current PU, the video encoding device first acquires optimal intra-frame prediction modes of the upper PU and the left PU of the current PU.

It should be noted that for a PU located at left edge of the image frame, for example, PUs with sequence numbers 1, 5, 9, and 13 shown in FIG. 3, the video encoding device cannot acquire optimal intra-frame prediction modes of left PUs adjacent to the PUs. For PUs located at an upper edge of the image frame, for example, PUs with sequence numbers 1, 2, 3, and 4 shown in FIG. 1, the video encoding device cannot acquire optimal intra-frame prediction modes of upper PUs adjacent to the PUs.

When neither of the second optimal intra-frame prediction mode of the upper PU and the second optimal intra-frame prediction mode of the left PU is a directional prediction mode, it indicates that texture features of the target PU and the adjacent PU have relatively large differences. Therefore, the video encoding device stops adding a candidate intra-frame prediction mode to the candidate mode set, and performs step 204.

Step 203B: If the second optimal intra-frame prediction mode of the upper PU or the second optimal intra-frame prediction mode of the left PU is a directional prediction mode, the video encoding device adds an optimal intra-frame prediction mode that is a directional prediction mode to the candidate mode set.

When an optimal intra-frame prediction mode of only the upper PU or the left PU is a directional prediction mode, it indicates that the target PU and the adjacent PU corresponding to the directional prediction mode have similar texture features. Therefore, the video encoding device adds the directional prediction mode to the candidate mode set, and performs step 204.

Step 203C: If the second optimal intra-frame prediction mode of the upper PU and the second optimal intra-frame prediction mode of the left PU are different and are both directional prediction modes, the video encoding device adds the second optimal intra-frame prediction mode of the upper PU and the second optimal intra-frame prediction mode of the left PU to the candidate mode set.

When the optimal intra-frame prediction modes of the upper PU and the left PU are directional prediction modes, the video encoding device further detects whether the two directional prediction modes are the same. If the two directional prediction modes are different, it indicates that the target PU and the adjacent PU have similar texture features. Therefore, to prevent an actual optimal intra-frame prediction mode from missing, the video encoding device adds both the directional prediction modes to the candidate mode set, and performs step 204.

In some embodiments, to improve the comprehensiveness of candidate intra-frame prediction modes, the video encoding device adds adjacent prediction modes corresponding to the two directional prediction modes to the candidate mode set together.

Step 203D: If the second optimal intra-frame prediction mode of the upper PU and the second optimal intra-frame prediction mode of the left PU are the same and are both directional prediction modes, the video encoding device adds the second optimal intra-frame prediction mode of the upper PU and an adjacent intra-frame prediction mode of the second optimal intra-frame prediction mode of the upper PU to the candidate mode set.

When the optimal intra-frame prediction modes of the upper PU and the left PU are both directional prediction modes, and the two directional prediction modes are the same, it indicates that the upper PU and the left PU have similar texture features. The current PU and the adjacent PU more probably have similar texture features. Therefore, the video encoding device adds the directional prediction mode and the adjacent intra-frame prediction mode of the directional prediction module to the candidate mode set, and performs step 204.

In some embodiments, to improve the comprehensiveness of the candidate intra-frame prediction mode, the video encoding device adds the adjacent prediction mode corresponding to the directional prediction mode together to the candidate mode set.

In this embodiment, the video encoding device extends the candidate mode set based on the optimal intra-frame prediction of the adjacent PU. While the quality of candidate intra-frame prediction modes is ensured, the quantity of candidate intra-frame prediction modes is reduced, thereby further reducing a subsequent calculation amount.

It should be noted that in the foregoing embodiments, the embodiments shown in FIG. 4 and FIG. 6 may be combined to obtain one complete embodiment, and the embodiments shown in FIG. 5 and FIG. 6 may be combined to obtain one complete embodiment. Details are not described herein again in the embodiments of the present application.

Apparatus embodiments of the present application are provided below. For details that are not thoroughly described in the apparatus embodiments, refer to the foregoing method embodiments that correspond to the apparatus embodiments one by one.

Figure 7:
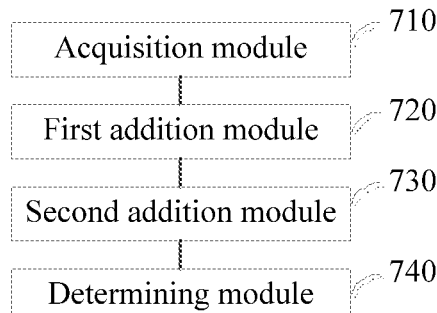
FIG. 7 is a structural block diagram of a video encoding device according to an embodiment of the present application.

FIG. 7 is a structural block diagram of a video encoding device according to an embodiment of the present application. The video encoding device may be implemented as a video encoding device or a part of the video encoding device. The apparatus includes:

an acquisition module 710, configured to acquire a first optimal intra-frame prediction mode of a downsampled unit corresponding to a target PU, where the downsampled unit is obtained by downsampling an image frame to which the target PU belongs and then dividing the downsampled image frame, and the first optimal intra-frame prediction mode is obtained by performing precoding analysis on the downsampled unit;

a first addition module 720, configured to add a candidate intra-frame prediction mode to a candidate mode set according to the first optimal intra-frame prediction mode;

a second addition module 730, configured to add a candidate intra-frame prediction mode to the candidate mode set according to a second optimal intra-frame prediction mode of an adjacent PU corresponding to the target PU; and a determining module 740, configured to determine an optimal intra-frame prediction mode of a current PU according to prediction residuals and encoding cost values corresponding to the candidate intra-frame prediction modes in the candidate mode set.

In some embodiments, when the target PU has 16×16 pixels, and the downsampled unit has 8×8 pixels, the first addition module 720 includes:

a first addition unit, configured to: when the first optimal intra-frame prediction mode is a directional prediction mode, add the first optimal intra-frame prediction mode, and an adjacent intra-frame prediction mode of the first optimal intra-frame prediction mode to the candidate mode set; and a second addition unit, configured to: when the first optimal intra-frame prediction mode is not a directional prediction mode, add a horizontal prediction mode and a vertical prediction mode to the candidate mode set, where the horizontal prediction mode is an intra-frame prediction mode corresponding to the direction ang_10, and the vertical prediction mode is an intra-frame prediction mode corresponding to the direction ang_26.

In some embodiments, the first addition module 720 further includes:

an acquisition unit, configured to acquire a suboptimal intra-frame prediction mode of the downsampled unit, where an encoding cost value of the suboptimal intra-frame prediction mode is greater than an encoding cost value of the first optimal intra-frame prediction mode; and a third addition unit, configured to: when the encoding cost value of the suboptimal intra-frame prediction mode is less than 2×the encoding cost value of the first optimal intra-frame prediction mode, and the suboptimal intra-frame prediction mode is a directional prediction mode, add the suboptimal intra-frame prediction mode and an adjacent intra-frame prediction mode of the suboptimal intra-frame prediction mode to the candidate mode set.

In some embodiments, when the target PU has 32×32 pixels or 64×64 pixels, and the downsampled unit has 8×8 pixels, the acquisition module 710 includes:

a first determining unit, configured to: determine sub-PUs included in the target PU, where each sub-PU is a PU with 16×16 pixels; and an acquisition unit, configured to acquire first optimal intra-frame prediction modes of downsampled units corresponding to the sub-PUs; and the first addition module 720 includes:

a fourth addition unit, configured to add the first optimal intra-frame prediction modes of the downsampled units to the candidate mode set; and a fifth addition unit, configured to: when a quantity of directional prediction modes in the candidate mode set is less than a threshold, add the candidate intra-frame prediction mode to the candidate mode set based on the first optimal intra-frame prediction modes of the downsampled units; and the second addition module 730 is further configured to: when the quantity of the directional prediction modes in the candidate mode set is greater than the threshold, perform the step of adding a candidate intra-frame prediction mode to the candidate mode set according to a second optimal intra-frame prediction mode of an adjacent PU corresponding to the target PU.

In some embodiments, the fifth addition unit is configured to:

if the first optimal intra-frame prediction modes of the downsampled units include the same directional prediction mode, add an adjacent intra-frame prediction mode of the same directional prediction mode to the candidate mode set;

if the candidate mode set includes a directional prediction mode, add an adjacent intra-frame prediction mode of the directional prediction mode, a horizontal prediction mode, and a vertical prediction mode to the candidate mode set; and if the candidate mode set includes n directional prediction modes, add adjacent intra-frame prediction modes corresponding to the n directional prediction modes to the candidate mode set, $1 < n \leq 3$.

In some embodiments, the adjacent PU includes an upper PU located above the target PU, and/or, a left PU located on the left of the target PU; and the second addition module 730 includes:

a sixth addition unit, configured to: when neither of the second optimal intra-frame prediction mode of the upper PU and the second optimal intra-frame prediction mode of the left PU is a directional prediction mode, stop adding a candidate intra-frame prediction mode to the candidate mode set;

a seventh addition unit, configured to: when the second optimal intra-frame prediction mode of the upper PU or the second optimal intra-frame prediction mode of the left PU is a directional prediction mode, add an optimal intra-frame prediction mode that is a directional prediction mode to the candidate mode set;

an eighth addition unit, configured to: when the second optimal intra-frame prediction mode of the upper PU and the second optimal intra-frame prediction mode of the left PU are different and are both directional prediction modes, add the second optimal intra-frame prediction mode of the upper PU and the second optimal intra-frame prediction mode of the left PU to the candidate mode set; and a ninth addition unit, configured to: when the second optimal intra-frame prediction mode of the upper PU and the second optimal intra-frame prediction mode of the left PU are the same and are both directional prediction modes, add the second optimal intra-frame prediction mode of the upper PU and an adjacent intra-frame prediction mode of the optimal intra-frame prediction mode of the upper PU to the candidate mode set.

In some embodiments, the apparatus further includes:
a third addition module, configured to add a planar mode and a DC mode to the candidate mode set.

In some embodiments, the determining module 740 includes:
a first calculation unit, configured to calculate the prediction residuals corresponding to the candidate intra-frame prediction modes in the candidate mode set, where each prediction residual is used for indicating a difference between a predicted value predicted according to a candidate intra-frame prediction mode and an original value;

a sorting unit, configured to sort the candidate intra-frame prediction modes in ascending order of prediction residuals;

a second determining unit, configured to determine first k candidate intra-frame prediction modes as target candidate intra-frame prediction modes, where k≥2;

a second calculation unit, configured to calculate encoding cost values corresponding to the target candidate intra-frame prediction modes; and a third determining unit, configured to determine a target candidate intra-frame prediction mode corresponding to a minimum encoding cost value as an optimal intra-frame prediction mode of the target PU.

In some embodiments, the determining module 740 further includes:
a tenth addition unit, configured to: when the first candidate intra-frame prediction mode is a directional prediction mode, and the adjacent intra-frame prediction mode of the first candidate intra-frame prediction mode does not belong to the candidate mode set, add the adjacent intra-frame prediction mode of the first candidate intra-frame prediction mode to the candidate mode set.

In conclusion, in this embodiment of the present application, during the selection of an optimal intra-frame prediction mode of a target PU, first, based on a characteristic that a downsampled unit keeps a feature of an original PU, a first optimal intra-frame prediction mode of a downsampled unit obtained during precoding is acquired, and some candidate intra-frame prediction modes are determined based on the first optimal intra-frame prediction mode of the downsampled unit; and then, based on a characteristic that adjacent PUs have similar features, some more candidate intra-frame prediction modes are determined according to second optimal intra-frame prediction modes of adjacent PUs of a current PU, so that an optimal intra-frame prediction mode of the current PU is selected from the determined candidate intra-frame prediction modes. Prediction residuals corresponding to only some candidate intra-frame prediction modes need to be calculated, and therefore, it takes a shortened time to select an intra-frame prediction mode, so that a video encoding speed is increased.

In this embodiment, the video encoding device extends the candidate mode set based on an optimal intra-frame prediction mode of a downsampled unit and/or a suboptimal intra-frame prediction mode, so that while the quality of candidate intra-frame prediction modes is ensured, a quantity of candidate intra-frame prediction modes is reduced, thereby further reducing a subsequent calculation amount.

In this embodiment, when a large size PU includes a plurality of small size sub-PUs, the video encoding device extends the candidate mode set according to the downsampled units corresponding to the sub-PUs, thereby ensuring the quality of the candidate intra-frame prediction modes in the candidate mode set. In addition, the quantity of candidate intra-frame prediction modes is reduced, thereby further reducing a subsequent calculation amount.

In this embodiment, the video encoding device extends the candidate mode set based on optimal intra-frame prediction modes of adjacent PUs, so that while the quality of candidate intra-frame prediction modes is ensured, the quantity of candidate intra-frame prediction modes is reduced, thereby further reducing a subsequent calculation amount.

It should be noted that the above functional modules are only described for exemplary purposes for the video encoding device provided in the foregoing embodiments. In actual applications, the functions may be allocated to different functional modules according to specific needs, which means that the internal structure of the apparatus is divided to different functional modules to complete all or some of the above described functions. In addition, the video encoding device provided in the foregoing embodiments are based on the same concept as the embodiments of the prediction mode selection method. For the specific implementation process, refer to the method embodiments, and the details are not described herein again.

Figure 8:
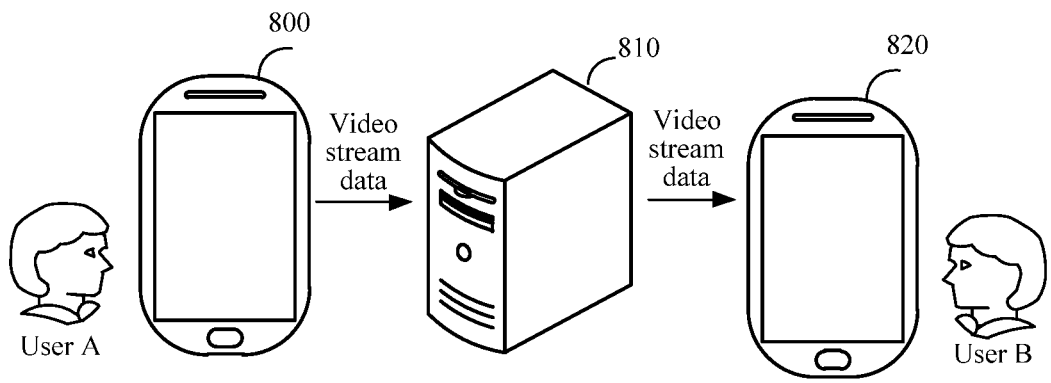
FIG. 8 is a schematic scenario diagram of an application scenario according to an embodiment of the present application.

In a possible application scenario, as shown in FIG. 8, a video encoding device 800 captures a user image of a user A by using a camera component, performs video encoding on each frame of the user image, and transmits video stream data obtained through encoding by a server 810 to a video decoding device 820 used by a user B, so that the video decoding device 820 decodes and renders the video stream data, so as to eventually display the user image of the user A. The video encoding device 800 and the video decoding device 820 may be terminals installed with video call applications. The prediction mode selection method provided in the embodiments of the present application is applied to the video encoding device 800.

Figure 9:
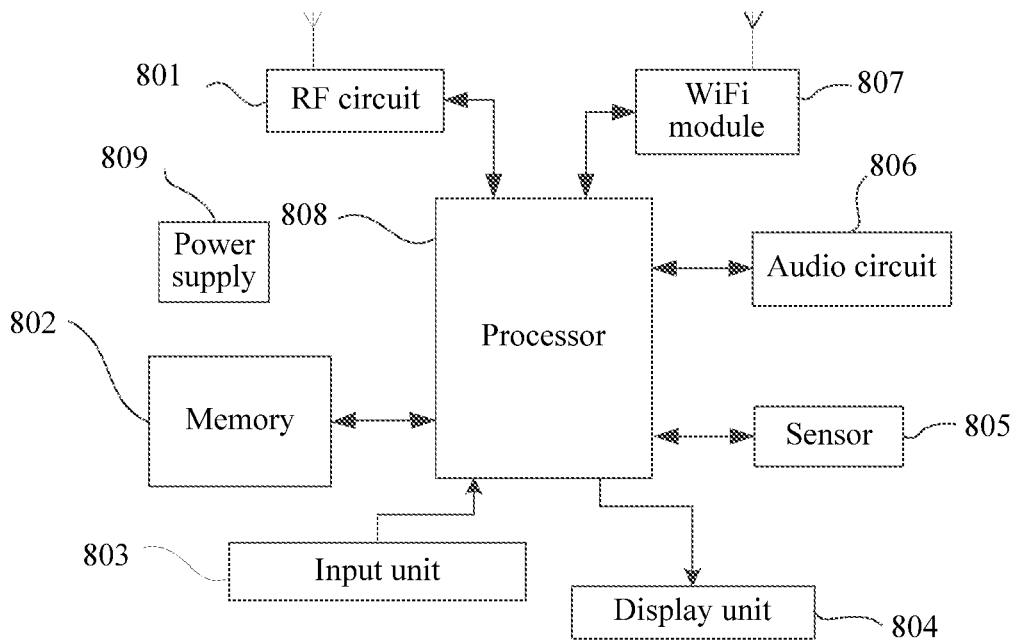
FIG. 9 is a block diagram of a video encoding device according to an embodiment of the present application.

FIG. 9 is a block diagram of the video encoding device 800 according to an embodiment of the present application. The device may include may include components such as a radio frequency (RF) circuit 801, a memory 802 including one or more computer readable storage media, an input unit 803, a display unit 804, a sensor 805, an audio circuit 806, a Wireless Fidelity (WiFi) module 807, a processor 808 including one or more processing cores, and a power supply 809. A person skilled in the art may understand that the structure of the video encoding device shown in FIG. 9 does not constitute any limitation on the video encoding device, and may include components more or fewer than those shown in the figure, or a combination of some components, or different component layouts.

The RF circuit 801 may be used to receive and send signals during an information receiving and sending process or a call process. Particularly, the RF circuit 801 receives downlink information from a base station, then delivers the downlink information to one or more processors 808 for processing, and sends related uplink data to the base station. Generally, the RF circuit 801 includes, but is not limited to, an antenna, at least one amplifier, a tuner, one or more oscillators, a subscriber identity module (SIM) card, a transceiver, a coupler, a low noise amplifier (LAN), and a duplexer. In addition, the RF circuit 801 may also communicate with a network and another device by using wireless communication. The wireless communication may use any communications standard or protocol, which includes, but is not limited to, Global System for Mobile Communications (GSM), General Packet Radio Service (GPRS), encode Division A plurality of Access (CDMA), Wideband encode Division A plurality of Access (WCDMA), Long Term Evolution (LTE), e-mail, a short messaging service (SMS), and the like.

The memory 802 may be configured to store a software program and module. The processor 808 runs the software program and module stored in the memory 802, to implement various functional applications and data processing. The memory 802 may mainly include a program storage area and a data storage area. The program storage area may store an operating system, an application program required by at least one function (such as a sound playback function and an image display function), and the like. The data storage area may store data (such as audio data and an address book) created according to use of the video encoding device. In this embodiment of the present invention, the program storage area is used to store a video encoding application program, and the data storage area is used to store original video data and encoded video data. In addition, the memory 802 may include a high speed random-access memory, and may also include a non-volatile memory, such as at least one magnetic disk storage device, a flash memory, or another volatile solid-state storage device. Accordingly, the memory 802 may further include a memory controller, so that the processor 808 and the input unit 803 access the memory 802.

The input unit 803 may be configured to receive input digit or character information, and generate a keyboard, mouse, joystick, optical, or track ball signal input related to the user setting and function control. Specifically, in a specific embodiment, the input unit 803 may include a touch sensitive surface and another input device. The touch sensitive surface, which may also be referred to as a touch display screen or a touch panel, may collect a touch operation of a user on or near the touch sensitive surface (such as an operation on or near the touch sensitive surface performed by a user by using any suitable object or accessory, such as a finger or a stylus), and drive a corresponding connection apparatus by using a preset program. In some embodiments, the touch sensitive surface may include two parts: a touch detection apparatus and a touch controller. The touch detection apparatus detects a touch position of a user, detects a signal generated by a touch operation, and sends the signal to the touch controller. The touch controller receives touch information from the touch detection apparatus, converts the touch information into contact coordinates, sends the contact coordinates to the processor 808, receives a command sent by the processor 808, and executes the command. In addition, the touch sensitive surface may be a resistive, capacitive, infrared, or surface sound wave type touch-sensitive surface. In addition to the touch sensitive surface, the input unit 803 may further include the another input device. Specifically, the another input device may include, but is not limited to, one or more of a physical keyboard, a functional key (such as a volume control key and a switch key), a trackball, a mouse, and a joystick.

The display unit 804 may be configured to display information input by a user or information provided to a user, and various graphical user interfaces of the video encoding device. These graphical user interfaces may be formed by a graph, a text, an icon, a video, or any combination thereof. The display unit 804 may include a display panel. In some embodiments, the display panel may be configured in the form of a liquid crystal display (LCD), an organic light-emitting diode (OLED), or the like. Further, the touch sensitive surface may cover the display panel. After detecting a touch operation on or near the touch sensitive surface, the touch sensitive surface transfers the touch operation to the processor 808, so as to determine the type of the touch event. Subsequently, the processor 808 provides a corresponding visual output on the display panel according to the type of the touch event. In FIG. 9, the touch sensitive surface and the display panel are used as two separate parts to implement input and output functions; however, in some embodiments, the touch sensitive surface and the display panel may be integrated to implement the input and output functions.

The video encoding device may further include at least one sensor 805, for example, an optical sensor, a motion sensor, and other sensors. Specifically, the optical sensor may include an ambient light sensor and a proximity sensor. The ambient light sensor may adjust the luminance of the display panel according to brightness of the ambient light, and the proximity sensor may switch off the display panel and/or backlight when the video encoding device is moved near an ear. As one type of the motion sensor, a gravity acceleration sensor can detect magnitude of accelerations in various directions (generally on three axes), may detect the magnitude and a direction of the gravity when static, and may be applied to an application that recognizes the attitude of the mobile phone (for example, switching between landscape and portrait orientation, a related game, and magnetometer attitude calibration), a function related to vibration recognition (such as a pedometer and a knock), and the like. Other sensors, such as a gyroscope, a barometer, a hygrometer, a thermometer, and an infrared sensor, which may be configured in the video encoding device are not further described herein.

The audio circuit 806, a loudspeaker, and a microphone may provide audio interfaces between the user and the video encoding device. The audio circuit 806 may convert received audio data into an electric signal and transmits the electric signal to the loudspeaker. The loudspeaker converts the electrical signal into a sound signal for output. On the other hand, the microphone converts a collected sound signal into an electrical signal. The audio circuit 806 receives the electrical signal and converts the electrical signal into audio data, outputs the audio data to the processor 808 for processing. Next, the processor 808 sends the audio data to another video encoding device by using the RF circuit 801, or outputs the audio data to the memory 802 for further processing. The audio circuit 806 may further include an earplug jack, so as to provide communication between a peripheral earphone and the video encoding device.

The WiFi is a short range wireless transmission technology. The video encoding device may help, by using a WiFi module 807, a user to receive and send e-mails, browse a webpage, access streaming media, and so on, which provides wireless broadband Internet access for the user. Although FIG. 9 shows the WiFi module 807, it may be understood that the WiFi module 807 is not a necessary component of the video encoding device, and when required, the WiFi module 807 may be omitted as long as the scope of the essence of the present disclosure is not changed.

The processor 808 is the control center of the video encoding device, and is connected to various parts of the video encoding device by using various interfaces and lines. By running or executing the software program and/or the module stored in the memory 802 and invoking data stored in the memory 802, the processor 808 performs various functions and data processing of the video encoding device, thereby performing overall monitoring on the video encoding device. In some embodiments, the processor 808 may include one or more processing cores. Preferably, the processor 808 may integrate an application processor and a modem. The application processor mainly processes an operating system, a user interface, an application program, and the like, and the modem mainly processes wireless communication. It may be understood that the foregoing modem may also be not integrated into the processor 808.

The video encoding device further includes the power supply 809 (such as a battery) for supplying power to the components. Preferably, the power supply may be logically connected to the processor 808 by using a power management system, thereby implementing functions such as charging, discharging and power consumption management by using the power management system. The power supply 809 may further include one or more of a direct current or alternating current power supply, a recharging system, a power failure detection circuit, a power supply converters or inverter, a power supply status indicator, and any other components.

Although not shown in the figure, the video encoding device may further include a camera, a Bluetooth module, and the like, which are not further described herein. Specifically, in this embodiment, the processor 808 in the video encoding device runs at least one instruction stored in the memory 802 to perform the prediction mode selection method provided in the method embodiments.

An embodiment of the present application further provides a computer readable storage medium. The storage medium stores at least one instruction, and the instruction is loaded and executed by a processor to implement the prediction mode selection method provided in the method embodiments.

The sequence numbers of the foregoing embodiments of the present invention are merely for the convenience of description, and do not imply the preference among the embodiments.

The foregoing descriptions are merely preferred embodiments of the present invention, but are not intended to limit the present disclosure. Any modification, equivalent replacement, or improvement made within the spirit and principle of the present disclosure shall fall within the protection scope of the present disclosure.

What is claimed is:

1. A prediction mode selection method performed by a video encoding device having one or more processors and memory storing instructions to be executed by the one or more processors, the method comprising:

obtaining a set of first optimal intra-frame prediction modes of a downsampled unit corresponding to a target prediction unit (PU), the downsampled unit being obtained by downsampling an image frame to which the target PU belongs, and the set of first optimal intra-frame prediction modes being obtained by performing precoding analysis on the downsampled unit, further including:
  identifying one or more sub-PUs included in the target PU; and
  determining a respective first optimal intra-frame prediction mode for each of the one or more sub-PUs based on the precoding analysis;
adding a first candidate intra-frame prediction mode from the set of first optimal intra-frame prediction modes to a candidate mode set;
adding a second candidate intra-frame prediction mode to the candidate mode set from a second optimal intra-frame prediction mode of an adjacent PU corresponding to the target PU; and
determining, from the candidate mode set, an optimal intra-frame prediction mode of a current PU according to a combination of prediction residuals and encoding cost values corresponding to candidate intra-frame prediction modes in the candidate mode set.

2. The method according to claim 1, wherein when the target PU has 16×16 pixels, and the downsampled unit has 8×8 pixels, the adding a candidate intra-frame prediction mode to a candidate mode set according to the first optimal intra-frame prediction mode comprises:
  if the first optimal intra-frame prediction mode is a directional prediction mode, adding the first optimal intra-frame prediction mode and an adjacent intra-frame prediction mode of the directional prediction mode to the candidate mode set; and
  if the first optimal intra-frame prediction mode is not a directional prediction mode, adding a horizontal prediction mode and a vertical prediction mode to the candidate mode set, wherein the horizontal prediction mode is an intra-frame prediction mode corresponding to the direction ang_10, and the vertical prediction mode is an intra-frame prediction mode corresponding to the direction ang_26.

3. The method according to claim 2, further comprising:
after adding a candidate intra-frame prediction mode to a candidate mode set according to the first optimal intra-frame prediction mode:
acquiring a suboptimal intra-frame prediction mode of the downsampled unit, wherein an encoding cost value of the suboptimal intra-frame prediction mode is greater than an encoding cost value of the first optimal intra-frame prediction mode; and
if the encoding cost value of the suboptimal intra-frame prediction mode is less than 2×the encoding cost value of the first optimal intra-frame prediction mode, and the suboptimal intra-frame prediction mode is a directional prediction mode, adding the suboptimal intra-frame prediction mode and an adjacent intra-frame prediction mode of the suboptimal intra-frame prediction mode to the candidate mode set.

4. The method according to claim 1, wherein when the target PU has 32×32 pixels or 64×64 pixels, the one or more sub-PUs have 16×16 pixels, and the downsampled unit has 8×8 pixels, the obtaining the set of first optimal intra-frame prediction modes of a downsampled unit corresponding to a target PU comprises:
acquiring first optimal intra-frame prediction modes of downsampled units corresponding to the sub-PUs; and
the adding a candidate intra-frame prediction mode to a candidate mode set according to the first optimal intra-frame prediction mode comprises:

adding the first optimal intra-frame prediction modes of the downsampled units to the candidate mode set;
if a quantity of directional prediction modes in the candidate mode set is less than a threshold, adding the candidate intra-frame prediction mode to the candidate mode set based on the first optimal intra-frame prediction modes of the downsampled units; and
if the quantity of the directional prediction modes in the candidate mode set is greater than the threshold, performing the step of adding a candidate intra-frame prediction mode to the candidate mode set according to a second optimal intra-frame prediction mode of an adjacent PU corresponding to the target PU.

5. The method according to claim 4, wherein the adding the candidate intra-frame prediction mode to the candidate mode set based on the first optimal intra-frame prediction modes of the downsampled units comprises:
if the first optimal intra-frame prediction modes of the downsampled units comprise the same directional prediction mode, adding an adjacent intra-frame prediction mode of the same directional prediction mode to the candidate mode set;
if the candidate mode set comprises a directional prediction mode, adding an adjacent intra-frame prediction mode of the directional prediction mode, a horizontal prediction mode, and a vertical prediction mode to the candidate mode set; and
if the candidate mode set comprises n directional prediction modes, adding adjacent intra-frame prediction modes corresponding to the n directional prediction modes to the candidate mode set, wherein 1<n≤3.

6. The method according to claim 1, wherein the adjacent PU comprises an upper PU located above the target PU, and/or, a left PU located on the left of the target PU; and
the adding a candidate intra-frame prediction mode to the candidate mode set according to a second optimal intra-frame prediction mode of an adjacent PU corresponding to the target PU comprises:
if neither of the second optimal intra-frame prediction mode of the upper PU and the second optimal intra-frame prediction mode of the left PU is a directional prediction mode, stopping adding a candidate intra-frame prediction mode to the candidate mode set;
if the second optimal intra-frame prediction mode of the upper PU or the second optimal intra-frame prediction mode of the left PU is a directional prediction mode, adding the second optimal intra-frame prediction mode that is a directional prediction mode to the candidate mode set;
if the second optimal intra-frame prediction mode of the upper PU and the second optimal intra-frame prediction mode of the left PU are different and are both directional prediction modes, adding the second optimal intra-frame prediction mode of the upper PU and the second optimal intra-frame prediction mode of the left PU to the candidate mode set; and
if the second optimal intra-frame prediction mode of the upper PU and the second optimal intra-frame prediction mode of the left PU are the same and are both directional prediction modes, adding the second optimal intra-frame prediction mode of the upper PU and an adjacent intra-frame prediction mode of the second optimal intra-frame prediction mode of the upper PU to the candidate mode set.

7. The method according to claim 1, further comprising: adding a planar mode and a direct current (DC) mode to the candidate mode set.

8. The method according to claim 1, wherein the determining an optimal intra-frame prediction mode of a current PU according to prediction residuals and encoding cost values corresponding to the candidate intra-frame prediction modes in the candidate mode set comprises:
calculating the prediction residuals corresponding to the candidate intra-frame prediction modes in the candidate mode set, wherein each prediction residual is used for indicating a difference between a predicted value predicted according to a candidate intra-frame prediction mode and an original value;
sorting the candidate intra-frame prediction modes in ascending order of prediction residuals;
determining first k candidate intra-frame prediction modes as target candidate intra-frame prediction modes, wherein k≥2;
calculating encoding cost values corresponding to the target candidate intra-frame prediction modes; and
determining a target candidate intra-frame prediction mode corresponding to a minimum encoding cost value as an optimal intra-frame prediction mode of the target PU.

9. The method according to claim 8, further comprising:
after the sorting the candidate intra-frame prediction modes in ascending order of prediction residuals:
if the first candidate intra-frame prediction mode is a directional prediction mode, and the adjacent intra-frame prediction mode of the first candidate intra-frame prediction mode does not belong to the candidate mode set, adding the adjacent intra-frame prediction mode of the first candidate intra-frame prediction mode to the candidate mode set, and performing the step of calculating the prediction residuals corresponding to the candidate intra-frame prediction modes in the candidate mode set.

10. A video encoding device, comprising one or more processors, memory coupled to the one or more processors, and instructions stored in the memory that, when executed by the one or more processors, cause the video encoding device to perform a plurality of operations including:
obtaining a set of first optimal intra-frame prediction modes of a downsampled unit corresponding to a target prediction unit (PU), the downsampled unit being obtained by downsampling an image frame to which the target PU belongs, and the set of first optimal intra-frame prediction mode being obtained by performing precoding analysis on the downsampled unit, further including:
identifying one or more sub-PUs included in the target PU; and
determining a respective first optimal intra-frame prediction mode for each of the one or more sub-PUs based on the precoding analysis;
adding a first candidate intra-frame prediction mode from the set of first optimal intra-frame prediction modes to a candidate mode set;
adding a second candidate intra-frame prediction mode to the candidate mode set from a second optimal intra-frame prediction mode of an adjacent PU corresponding to the target PU; and
determining, from the candidate mode set, an optimal intra-frame prediction mode of a current PU according to a combination of prediction residuals and encoding cost values corresponding to candidate intra-frame prediction modes in the candidate mode set.

11. The video encoding device according to claim 10, wherein, when the target PU has 16×16 pixels, and the downsampled unit has 8×8 pixels, the operation of adding a candidate intra-frame prediction mode to a candidate mode set according to the first optimal intra-frame prediction mode comprises:
  if the first optimal intra-frame prediction mode is a directional prediction mode, adding the first optimal intra-frame prediction mode and an adjacent intra-frame prediction mode of the directional prediction mode to the candidate mode set; and
  if the first optimal intra-frame prediction mode is not a directional prediction mode, adding a horizontal prediction mode and a vertical prediction mode to the candidate mode set, wherein the horizontal prediction mode is an intra-frame prediction mode corresponding to the direction ang_10, and the vertical prediction mode is an intra-frame prediction mode corresponding to the direction ang_26.

12. The video encoding device according to claim 11, wherein the plurality of operations further comprise:
  after adding a candidate intra-frame prediction mode to a candidate mode set according to the first optimal intra-frame prediction mode:
  acquiring a suboptimal intra-frame prediction mode of the downsampled unit, wherein an encoding cost value of the suboptimal intra-frame prediction mode is greater than an encoding cost value of the first optimal intra-frame prediction mode; and
  if the encoding cost value of the suboptimal intra-frame prediction mode is less than 2×the encoding cost value of the first optimal intra-frame prediction mode, and the suboptimal intra-frame prediction mode is a directional prediction mode, adding the suboptimal intra-frame prediction mode and an adjacent intra-frame prediction mode of the suboptimal intra-frame prediction mode to the candidate mode set.

13. The video encoding device according to claim 10, wherein when the target PU has 32×32 pixels or 64×64 pixels, the one or more sub-PUs have 16×16 pixels, and the downsampled unit has 8×8 pixels, the operation of obtaining the set of first optimal intra-frame prediction modes of a downsampled unit corresponding to a target PU comprises:
  acquiring first optimal intra-frame prediction modes of downsampled units corresponding to the sub-PUs; and
  the adding a candidate intra-frame prediction mode to a candidate mode set according to the first optimal intra-frame prediction mode comprises:
  adding the first optimal intra-frame prediction modes of the downsampled units to the candidate mode set;
  if a quantity of directional prediction modes in the candidate mode set is less than a threshold, adding the candidate intra-frame prediction mode to the candidate mode set based on the first optimal intra-frame prediction modes of the downsampled units; and
  if the quantity of the directional prediction modes in the candidate mode set is greater than the threshold, performing the step of adding a candidate intra-frame prediction mode to the candidate mode set according to a second optimal intra-frame prediction mode of an adjacent PU corresponding to the target PU.

14. The video encoding device according to claim 13, wherein the operation of adding the candidate intra-frame prediction mode to the candidate mode set based on the first optimal intra-frame prediction modes of the downsampled units comprises:
  if the first optimal intra-frame prediction modes of the downsampled units comprise the same directional prediction mode, adding an adjacent intra-frame prediction mode of the same directional prediction mode to the candidate mode set;
  if the candidate mode set comprises a directional prediction mode, adding an adjacent intra-frame prediction mode of the directional prediction mode, a horizontal prediction mode, and a vertical prediction mode to the candidate mode set; and
  if the candidate mode set comprises n directional prediction modes, adding adjacent intra-frame prediction modes corresponding to the n directional prediction modes to the candidate mode set, wherein $1 < n \leq 3$.

15. The video encoding device according to claim 10, wherein the operation of adjacent PU comprises an upper PU located above the target PU, and/or, a left PU located on the left of the target PU; and
  the operation of adding a candidate intra-frame prediction mode to the candidate mode set according to a second optimal intra-frame prediction mode of an adjacent PU corresponding to the target PU comprises:
  if neither of the second optimal intra-frame prediction mode of the upper PU and the second optimal intra-frame prediction mode of the left PU is a directional prediction mode, stopping adding a candidate intra-frame prediction mode to the candidate mode set;
  if the second optimal intra-frame prediction mode of the upper PU or the second optimal intra-frame prediction mode of the left PU is a directional prediction mode, adding the second optimal intra-frame prediction mode that is a directional prediction mode to the candidate mode set;
  if the second optimal intra-frame prediction mode of the upper PU and the second optimal intra-frame prediction mode of the left PU are different and are both directional prediction modes, adding the second optimal intra-frame prediction mode of the upper PU and the second optimal intra-frame prediction mode of the left PU to the candidate mode set; and
  if the second optimal intra-frame prediction mode of the upper PU and the second optimal intra-frame prediction mode of the left PU are the same and are both directional prediction modes, adding the second optimal intra-frame prediction mode of the upper PU and an adjacent intra-frame prediction mode of the second optimal intra-frame prediction mode of the upper PU to the candidate mode set.

16. The video encoding device according to claim 10, wherein the plurality of operations further comprise:
  adding a planar mode and a direct current (DC) mode to the candidate mode set.

17. The video encoding device according to claim 10, wherein the operation of determining an optimal intra-frame prediction mode of a current PU according to prediction residuals and encoding cost values corresponding to the candidate intra-frame prediction modes in the candidate mode set comprises:
  calculating the prediction residuals corresponding to the candidate intra-frame prediction modes in the candidate mode set, wherein each prediction residual is used for indicating a difference between a predicted value predicted according to a candidate intra-frame prediction mode and an original value;
  sorting the candidate intra-frame prediction modes in ascending order of prediction residuals;
  determining first k candidate intra-frame prediction modes as target candidate intra-frame prediction modes, wherein $k \geq 2$;

calculating encoding cost values corresponding to the target candidate intra-frame prediction modes; and determining a target candidate intra-frame prediction mode corresponding to a minimum encoding cost value as an optimal intra-frame prediction mode of the target PU.

18. The video encoding device according to claim 17, wherein the plurality of operations further comprise:

after the sorting the candidate intra-frame prediction modes in ascending order of prediction residuals:

if the first candidate intra-frame prediction mode is a directional prediction mode, and the adjacent intra-frame prediction mode of the first candidate intra-frame prediction mode does not belong to the candidate mode set, adding the adjacent intra-frame prediction mode of the first candidate intra-frame prediction mode to the candidate mode set, and performing the step of calculating the prediction residuals corresponding to the candidate intra-frame prediction modes in the candidate mode set.

19. A non-transitory computer readable storage medium storing a plurality of instructions in connection with a video encoding device having one or more processors, wherein the plurality of instructions, when executed by the one or more processors, cause the video encoding device to perform a plurality of operations including:

obtaining a set of first optimal intra-frame prediction modes of a downsampled unit corresponding to a target prediction unit (PU), the downsampled unit being obtained by downsampling an image frame to which the target PU belongs, and the set of first optimal intra-frame prediction modes being obtained by performing precoding analysis on the downsampled unit, further including:

identifying one or more sub-PUs included in the target PU; and determining a respective first optimal intra-frame prediction mode for each of the one or more sub-PUs based on the precoding analysis;

adding a first candidate intra-frame prediction mode from the set of first optimal intra frame prediction modes to a candidate mode;

adding a second candidate intra-frame prediction mode to the candidate mode set from a second optimal intra-frame prediction mode of an adjacent PU corresponding to the target PU; and determining, from the candidate mode set, an optimal intra-frame prediction mode of a current PU according to a combination of prediction residuals and encoding cost values corresponding to candidate intra-frame prediction modes in the candidate mode set.

20. The non-transitory computer readable storage medium according to claim 19, wherein, when the target PU has 16×16 pixels, and the downsampled unit has 8×8 pixels, the operation of adding a candidate intra-frame prediction mode to a candidate mode set according to the first optimal intra-frame prediction mode comprises:

if the first optimal intra-frame prediction mode is a directional prediction mode, adding the first optimal intra-frame prediction mode and an adjacent intra-frame prediction mode of directional prediction mode to the candidate mode set; and if the first optimal intra-frame prediction mode is not a directional prediction mode, adding a horizontal prediction mode and a vertical prediction mode to the candidate mode set, wherein the horizontal prediction mode is an intra-frame prediction mode corresponding to the direction ang_10, and the vertical prediction mode is an intra-frame prediction mode corresponding to the direction ang_26.

* * * * *